United States Patent [19]

Chiba

[11] Patent Number: 4,617,677
[45] Date of Patent: Oct. 14, 1986

[54] DATA SIGNAL READING DEVICE

[75] Inventor: Toshihiko Chiba, Saitama, Japan

[73] Assignee: Pioneer Electronic Corporation, Tokyo, Japan

[21] Appl. No.: 696,554

[22] Filed: Jan. 30, 1985

[30] Foreign Application Priority Data

Jan. 31, 1984 [JP] Japan .............................. 59-11967[U]

[51] Int. Cl.⁴ ............................................. H04L 1/00
[52] U.S. Cl. .................................... 375/94; 375/104; 329/106; 328/112; 328/165
[58] Field of Search ................... 375/94, 99, 102, 104; 329/106; 328/112, 165

[56] References Cited

U.S. PATENT DOCUMENTS

| | | | |
|---|---|---|---|
| 3,366,930 | 1/1968 | Bennett et al. | 375/104 |
| 3,879,665 | 4/1975 | Carlow et al. | 375/99 |
| 4,514,854 | 4/1985 | Ashida | 375/94 |

Primary Examiner—John S. Heyman
Attorney, Agent, or Firm—Sughrue, Mion, Zinn, Macpeak & Seas

[57] ABSTRACT

A data signal reading device for reading an input data signal, such as may be received from an infrared remote control device, wherein the amount of error contained in the output signal is reduced. The input signal is subjected to level decision while being sampled with a clock pulse signal having a predetermined period to provide decision outputs. A first counter counts the number of occurrences of one level and responds to the decision output, while a second counter counts the number of occurrences of the other level. The second counter is initialized when it is determined that the decision output is of the one level. The counting operations of the first and second counters are suspended for a period of time slightly longer than the shorter of the two different durations when the content of the second counter reaches a predetermined value. The output state is determined according to the content of the first counter present when the second counter reaches the predetermined value.

2 Claims, 10 Drawing Figures

FIG. 3
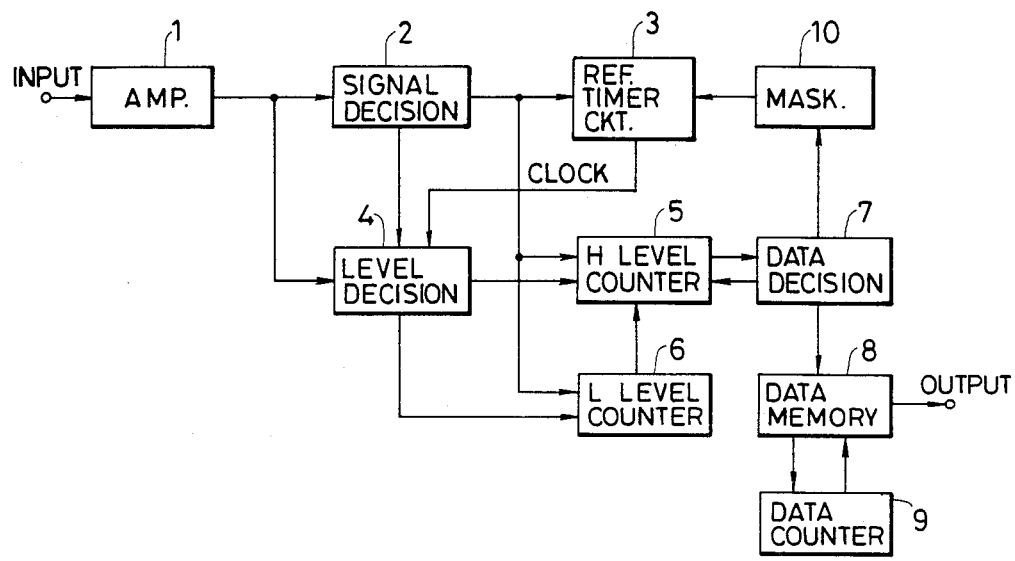
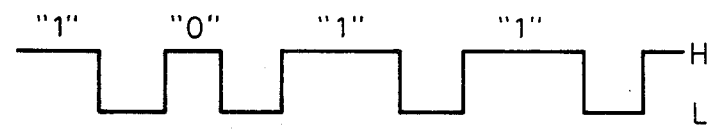
FIG. 4A
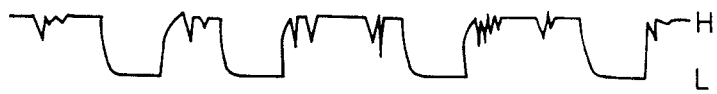
FIG. 4B
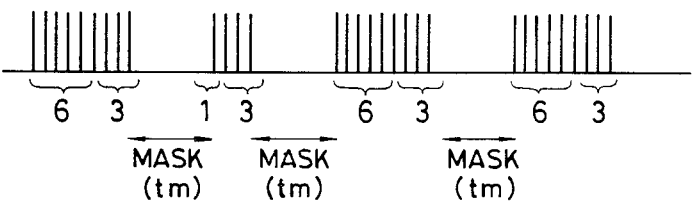
FIG. 4C

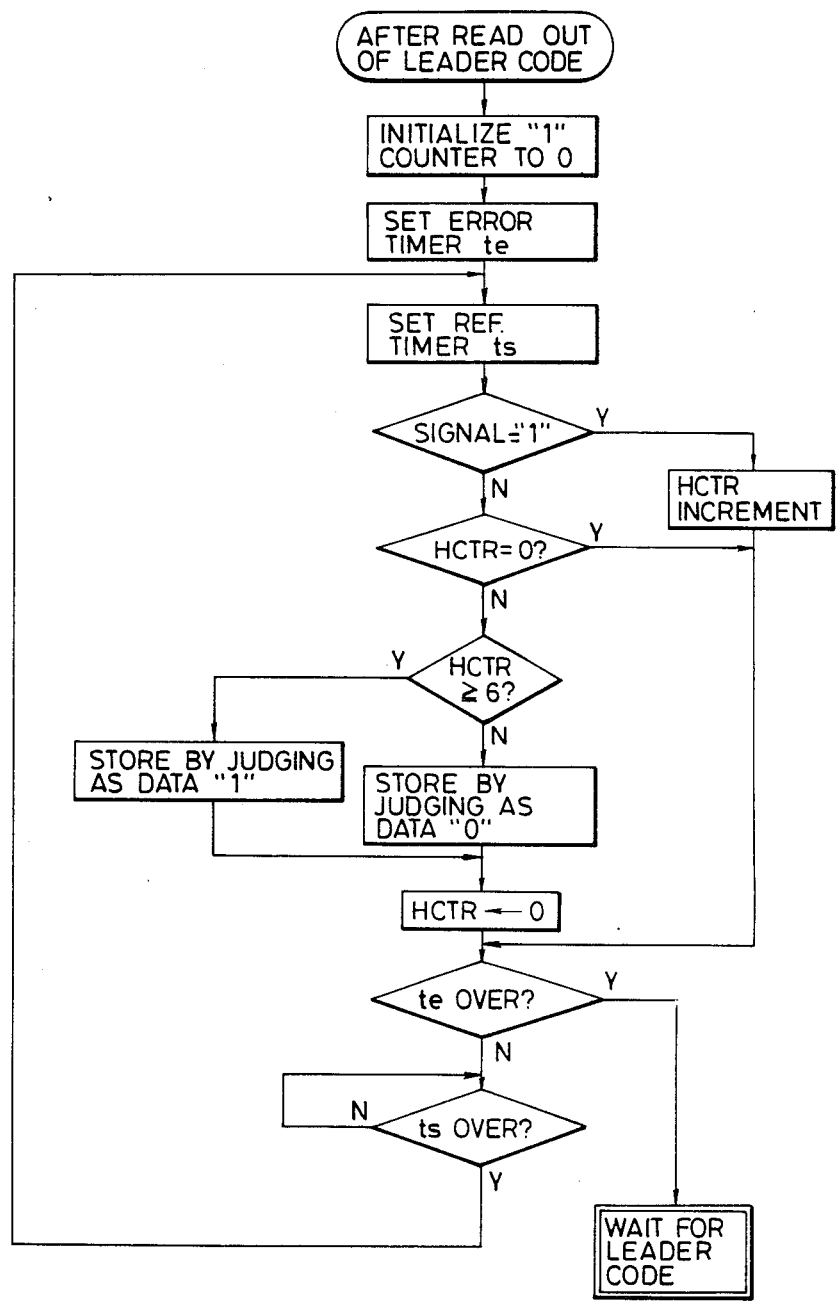

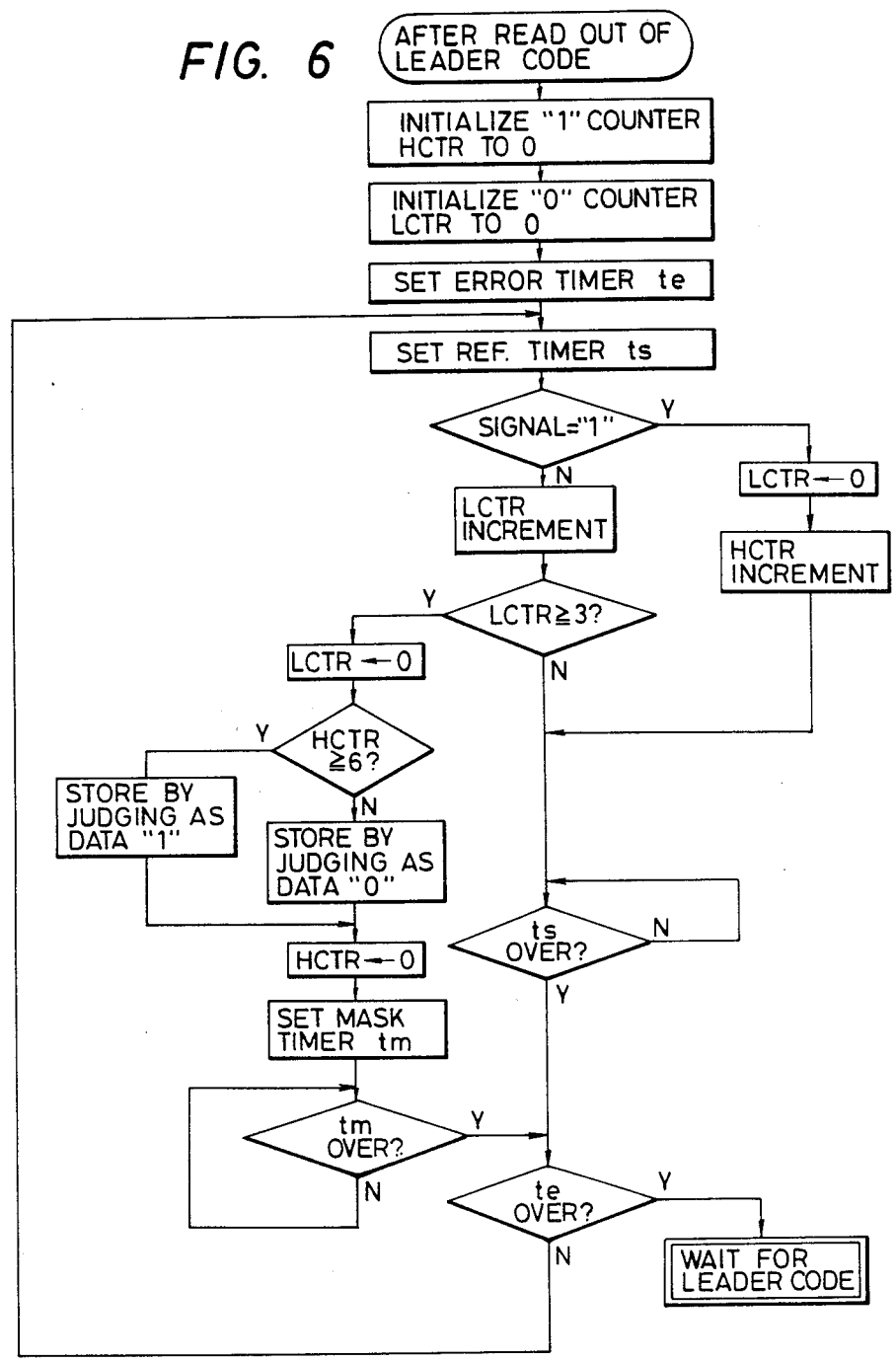

DATA SIGNAL READING DEVICE

BACKGROUND OF THE INVENTION

The present invention relates to data signal reading devices, and more particularly, to a data signal reading device for reading the data of an infrared remote control signal.

A conventional data signal reading device of this type is constructed as shown in FIG. 1. In the device, an infrared signal transmitted from the signal transmitting section of, for instance, a remote control device is amplified by an amplifier 1 and applied to a leader signal decision circuit 2, which determines whether or not the signal applied thereto is a remote control signal, and to a level decision circuit 4, which performs a level decision in a sampling mode every time a reference timer circuit 3 produces a reference clock pulse. Of the level decision results provided by the level decision circuit 4, the number of H (high) level results are counted by an H level counter 5, and the number of L (low) level results are counted by an L level counter 6. According to the content of the H level counter 5, a data decision circuit 7 decides whether the input data is "1" or "0". The data decision results provided by the data decision circuit 7 are stored by a memory 8. The number of "1" data bits stored in the memory 8 is counted by a data counter 9, and the memory 8 outputs as many control signals as the number of "1" data bits set in the counter 9.

The operation of the device shown in FIG. 1 will be described with reference to the timing chart of FIGS. 2A through 2C. In the infrared signal provided by the signal transmitting section in the remote control device, as shown in FIG. 2A, data bits in the "1" state are represented by H level signals. The transmitted signal indicated in FIG. 2A has been converted to the form in FIG. 2B upon arrival at the input terminal in FIG. 1 due to noise affecting the H level signal portions.

Upon reception of such an input signal, the signal decision circuit 2 decides whether or not the leader signal of the remote control is contained therein. When it has been determined that the leader signal is present, a reference clock pulse having a predetermined period is applied to the level decision circuit 4 from the timer generating circuit 3 and the input signal level is sampled with the clock pulse thus applied. The waveform of the sampling signal is as shown in FIG. 2C.

The H level counter 5 counts the H level decision results provided by the level decision circuit 4, and the L level counter 6 counts the L level decision results provided by the level decision circuit 4. When the content of the L level counter 6 reaches a predetermined value (four in the case illustrated), it is determined that the input signal is at the L level, whereupon the content of the H level counter 5 is applied to the data decision circuit 7. In the circuit 7, it is determined whether the content of the H level counter 5 is larger than a reference value (seven in the case illustrated) or smaller than that value. If the content is smaller (for instance, six), the input data is determined as being a "0", and if it is larger (for instance, eleven) then it is determined as being a "1". The "1" decision results are stored in the memory 8, and the data bits thus stored are counted by the counter 9. When a predetermined number (four, for instance) of "1" data bits have been stored, the counter 9 operates to output the content of the memory 8 as a data read signal.

In the above-described conventional device, the durations of the H level signals, which are the significant components of the input signal, are determined by counting sampled pulses. Therefore, in the case where significant noise is mixed with the input signal, the device may operate erroneously. That is, the conventional device is low in reliability.

SUMMARY OF THE INVENTION

Overcoming the above-noted drawbacks, the invention provides a data signal reading device in which, instead of an active H level signal with which noise is more liable to interfere, only an active L level signal, with which noise is less likely to interfere, is subjected to decision to thus read incoming data correctly.

More specifically, according to the invention there is provided a data signal reading device for reading an input signal in which data signal segments representing "1" and "0" are determined separately according to two different durations of one of two different levels, and a predetermined duration of the other level is provided between the data signal segments representing "1" and "0", which, according to the invention, comprises: level decision means for subjecting an input signal to level decision while sampling it with a clock signal having a predetermined period to provide decision outputs; a first counter for counting the number of times of occurrence of the one level in response to the decision outputs; a second counter for counting the number of times of occurrence of the other level in response to the decision outputs; initializing means for initializing the second counter when it is determined that the decision output is of the one level; means for suspending the counting operations of the first and second counters for a period of time slightly longer than the shorter of the two different durations when the content of the second counter reaches a predetermined value; and data decision means for deciding data "1" and "0" in the input signal according to the content of the first counter which is obtained when the second counter reaches the predetermined value.

BRIEF DESCRIPTION OF THE DRAWINGS

FIG. 3 is a block diagram showing an example of a data signal reading device according to the invention;

FIGS. 4A through 4C taken together, are a timing chart provided for a description of the operation of the device shown in FIG. 3;

FIG. 5 is a flowchart for the conventional device using a microcomputer; and

FIG. 6 is a flowchart for the device of the invention using a microcomputer.

DESCRIPTION OF THE PREFERRED EMBODIMENTS

Preferred embodiments of the invention will be described with reference to the drawings.

Figure 1:
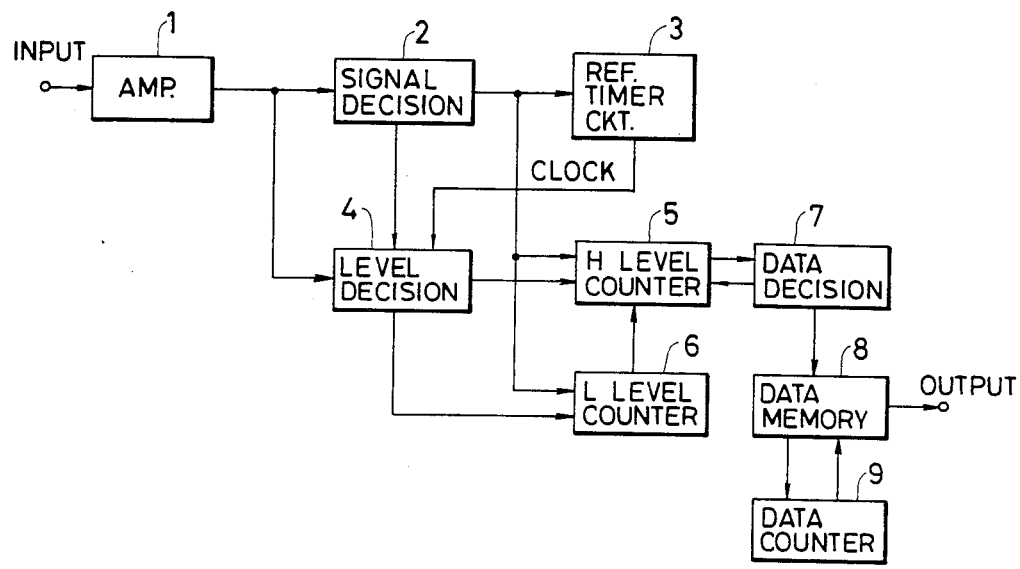
FIG. 1 is a block diagram showing a conventional data signal reading device.

FIG. 3 is a block diagram showing a preferred embodiment of the invention. A data signal reading device of the invention is constructed by adding a masking circuit 10 to the device shown in FIG. 1. The masking circuit 10 is designed so that, when the content of the L level counter 6 reaches a predetermined value, the reference timer circuit 3 is rendered inactive so that level decision cannot be carried out for a predetermined period of time, thereby to mask the generation of clock pulses.

FIGS. 4A through 4C are collectively a timing chart for a description of the operation of the circuit shown in FIG. 3. More specifically, FIGS. 4A, 4B, and 4C show a transmitted signal, a received signal, and sampling pulses, respectively. When an input signal is determined to be a remote control leader signal, the reference timer circuit 3 is allow to generate sampling clock pulses so that level decision is performed by the level decision circuit 4. When the decision result is at the H level, the L level counter 6 is initialized. The initialization is carried out by the level decision circuit 4.

If the decision result is at the L level, then the L level counter 6 is incremented. More specifically, the counting operation is carried out until the count value reaches a predetermined value (three in the case of FIGS. 4A through 4C. If the decision result is at the H level even once, the counter 6 is initialized. Therefore, when the L level decision result reaches the predetermined value (three), the content of the H level counter 5 is applied to the data decision circuit 7. In the data decision circuit 7, the content of the H level counter 5 is compared with the reference value (six), and if it is smaller than the reference value, the data is determined as being "0", and if it is equal to or larger than the reference value, the data is determined as being "1".

The masking circuit 10 outputs a masking signal for a predetermined period of time $t_m$ slightly longer than the H level duration which corresponds to "0".

Accordingly, the level decision is carried out using a stream of clock pulses as shown in FIG. 4C. That is, the level decision for incoming data bit is carried out a predetermined number of times. No decisions of the H levels, with which noise can more strongly interfere, are necessary.

In the above-described embodiment, when three successive L level decisions are performed by the L level counter 6, the content of the H level counter is determined while the counting operation is being masked for a predetermined period of time. However, the invention is not limited to the above-described number (three) of times of determining the L level; that is, the number of times may be more than three. However, if it is smaller than three, then the effect is lowered. On the other hand, the content of the H level counter may be compared with a value other than six; that is, the reference value may be determined suitably according to the pulse period and the signal level width.

Instead of the clock pulses employed in the arrangement of FIG. 3, a microcomputer may be employed. In this case, the operation is as indicated by a flowchart shown in FIG. 6. By way of example, FIG. 5 is a flowchart for the conventional data signal reading device. In FIGS. 5 and 6, HCTR designates the count value of the H level counter 5; LCTR, the count value of the L level counter 6; and $t_s$, the clock pulse period. Further in FIGS. 5 and 6, in the step "Error Timer $t_e$ Setting", when the level decision takes more than a predetermined time $t_e$, the decision is determined as being erroneous and no output is provided.

Figure 2A:
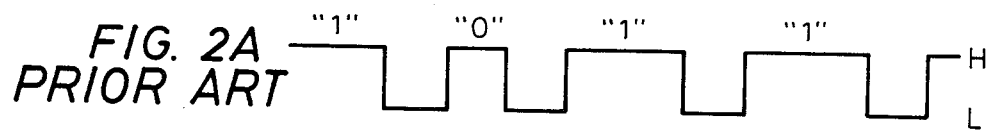
FIGS. 2A through 2C, taken together, are a timing chart provided for a description of the operation of the device shown in FIG. 1.
Figure 2B:
Figure 2C:
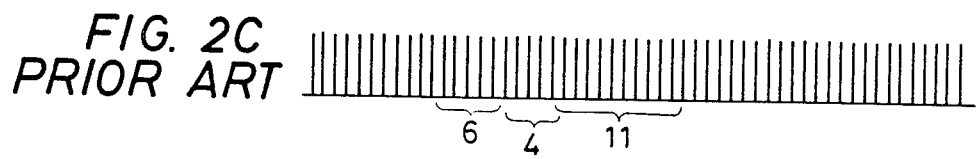

As is apparent from the above description, according to the invention, decisions of the H levels, which are more strongly affected by noise, are inhibited by masking them so that only the L levels, which are relatively free from noise, are detected to decide the data bit "1" and "0". Therefore, the continuous number of times of L level decision can be determined so that the data decision can be achieved with high accuracy. While the invention has been described with reference to an infrared remote control signal, the technical concept of the invention can be applied to any signal of the kind in FIG. 2A.

I claim:

1. A data signal reading device for reading an input signal in which data signal segments representing "1" and "0" are determined separately according to two different durations of one of two different levels and a predetermined duration of the other level is provided between said data signal segments representing "1" and "0", comprising:

level decision means for subjecting an input signal to level decision while sampling said input signal with a clock pulse having a predetermined period to provide decision outputs;

a first counter for counting a number of times of occurrence of said one level in response to said decision outputs;

a second counter for counting a number of times of occurrence of said other level in response to said decision outputs;

means for initializing said second counter when it is determined that said decision output is of said one level;

means for for suspending the counting operations of said first and second counters for a period of time slightly longer than the shorter of said two different durations when the content of said second counter reaches a predetermined value; and data decision means for determining data signal segments "1" and "0" in said input signal according to the content of said first counter obtained when the content of said second counter reaches said predetermined value.

2. A data signal reading method for reading an input signal in which data signal segments representing "1" and "0" are determined separately according to two different durations of one of two different levels and a predetermined duration of the other level is provided between said data signal segments representing "1" and "0", comprising the steps of:

(1) subjecting an input signal to level decision while sampling said input signal with a clock pulse having a predetermined period to provide decision outputs;

(2) counting a number of times of occurrence of said one level in response to said decision outputs;

(3) counting a number of times of occurrence of said other level in response to said decision outputs;

(4) initializing the count in step (3) when it is determined that said decision output is of said one level;

(5) suspending the counting of steps (2) and (3) for a period of time slightly longer than the shorter of said two different durations when the count obtained in step (3) reaches a predetermined value; and (6) determining data signal segments "1" and "0" in said input signal according to the count obtained in step (2) when the count obtained in step (3) reaches said predetermined value.

* * * * *